(12) United States Patent
Yamaki et al.

(10) Patent No.: US 9,899,664 B2
(45) Date of Patent: Feb. 20, 2018

(54) CATHODE ACTIVE MATERIAL FOR LITHIUM ION BATTERY, CATHODE MATERIAL FOR LITHIUM ION BATTERY, AND LITHIUM ION BATTERY

(71) Applicant: Hitachi Chemical Company, Ltd., Chiyoda-Ku, Tokyo (JP)

(72) Inventors: Takahiro Yamaki, Tokyo (JP); Masanari Oda, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 15/196,709

(22) Filed: Jun. 29, 2016

(65) Prior Publication Data
US 2017/0040594 A1 Feb. 9, 2017

(30) Foreign Application Priority Data

Aug. 4, 2015 (JP) .................................. 2015-153922

(51) Int. Cl.
| | |
|---|---|
| *H01M 4/505* | (2010.01) |
| *H01M 4/525* | (2010.01) |
| *H01M 4/485* | (2010.01) |
| *H01M 4/1315* | (2010.01) |
| *H01M 10/0525* | (2010.01) |

(52) U.S. Cl.
CPC .......... *H01M 4/1315* (2013.01); *H01M 4/505* (2013.01); *H01M 4/525* (2013.01); *H01M 10/0525* (2013.01)

(58) Field of Classification Search
CPC ....... H01M 4/505; H01M 4/525; H01M 4/485
See application file for complete search history.

(56) References Cited

U.S. PATENT DOCUMENTS 6,040,089 A * 3/2000 Manev ................. H01M 4/131
429/224
2002/0044906 A1 4/2002 Tabata et al.
2004/0202938 A1 10/2004 Noguchi et al.
2009/0087362 A1 4/2009 Sun et al.
(Continued)

FOREIGN PATENT DOCUMENTS

JP 2002-75366 A 3/2002
JP 2003-229130 A 8/2003
JP 2008-536285 A 9/2008

OTHER PUBLICATIONS

Stroukoff et al. (J. Mater. Chem., 2011, 21, 10165).*

*Primary Examiner* — Olatunji Godo
(74) *Attorney, Agent, or Firm* — Crowell & Moring LLP

(57) ABSTRACT

Provided are a cathode active material with excellent high-temperature life that suppresses the elution of metal elements from the cathode active metal and the generation of different phase therein and exhibits a high potential, as well as a high-voltage lithium ion battery that achieves excellent high-temperature life by applying such a cathode active material. The cathode active material for a lithium ion battery is represented by a compositional formula $Li_aNi_xMn_yM_zO_{4-\delta}F_\delta$ (where M is one or more elements selected from the group consisting of Ti, Ge, Mg, Co, Fe, Cu, and Al, and a, x, y, z, and δ satisfy the following formulas: $1 \le a < 1.08$, $0.4 \le x < 0.5$, $0 < z \le 0.3$, $a+x+y+z=3$, and $0 < \delta \le 0.2$).

9 Claims, 2 Drawing Sheets

(56) References Cited

U.S. PATENT DOCUMENTS

2011/0311869 A1* 12/2011 Oh .................. H01M 4/131
                                                                       429/211
2012/0070725 A1* 3/2012 Venkatachalam ... H01M 4/1397
                                                                       429/188

\* cited by examiner

CATHODE ACTIVE MATERIAL FOR LITHIUM ION BATTERY, CATHODE MATERIAL FOR LITHIUM ION BATTERY, AND LITHIUM ION BATTERY

CLAIM OF PRIORITY

The present application claims priority from. Japanese Patent application serial No. 2015-153922, filed on Aug. 4, 2015, the content of which is hereby incorporated by reference into this application.

BACKGROUND OF THE INVENTION (Field of the Invention)

The present invention relates to a cathode active material for a lithium ion battery, a cathode material for a lithium ion battery, and a lithium ion battery.

(Description of Related Art)

Lithium ion batteries have been widely used as small-sized power sources for mobile information terminals and the like because of their high energy density. In recent years, lithium ion batteries have also been utilized as large-sized power sources for electric vehicles, hybrid-EVs, or power storage.

In some applications as large-sized power sources, a number of lithium ion batteries are used in multiple series. To achieve a battery with a higher energy density or to decrease the number of batteries connected in series, a lithium ion battery is required to have a higher voltage than a conventional lithium ion battery. For this reason, the lithium ion battery needs a cathode active material that stably exhibits a high potential of 4.5 V or more based on lithium metal as a reference.

As such a cathode active material, a spinel-type composite oxide is known in which a specific transition metal substitutes for a part of Mn in a compound represented by a general formula $LiMn_{2-x}M_xO_4$ (where M is Ni, Co, Cr, Fe, Cu, etc.).

In particular, in the spinel-type composite oxide with Ni as M (hereinafter referred to as a "5 V spinel"), a change in valence of Ni stabilizes and exhibits the high potential of around 4.7 V. The high potential capacity is substantially proportional to the amount of substitution x in the above-mentioned general formula. The theoretical composition $LiMn_{1.5}Ni_{0.5}O_4$ is known to have, in theory, a discharge potential of 4.7 V as a whole.

Japanese Patent Application Laid-Open No. 2002-75366 (Patent Document 1) discloses a cathode active material that is a manganese-based spinel-type composite oxide containing fluorine as a constituent element in terms of improving charge-discharge cycle characteristics, particularly, cycle characteristics under a high-temperature atmosphere.

Japanese Translation of PCT International Application Publication No. JP-T-2008-536285 (Patent Document 2) discloses a cathode active material having a cubic structure and represented by a spinel $Li_{1+a}[Ni_{0.5}Mn_{1.5-x}M_x]O_{4-b}F_b$ (where M is at least one metal selected from the group consisting of Co, Ni, Cr, Mg, Al, Zn, Mo and W), with a fluorine compound covering the surface of the cathode active material.

Japanese Patent Application Laid-Open. No. 2003-229130 (Patent Document 3) discloses a cathode active material having a high capacity and a high voltage of 4.5 V or more for Li. The cathode active material is formed by substituting any one of the monovalent to trivalent metal elements lighter than Mn for a part of Mn and also by substituting F or Cl for O in $Li(Ni_zMn_{2-x})O_4$ ($0.4 \le x \le 0.6$).

SUMMARY OF THE INVENTION

A cathode active material for a lithium ion battery according to the present invention includes a compound represented by a compositional formula $Li_aNi_xMn_yM_zO_{4-\delta}F_\delta$ (where M is one or more kinds of elements selected from the group consisting of Ti, Ge, Mg, Co, Fe, Cu and Al, and a, x, y, z and δ satisfy the following formulas: $1 \le a < 1.08$; $0.4 \le x < 0.5$; $0 < z \le 0.3$; $a+x+y+z=3$; and $0 < \delta \le 0.2$.)

Accordingly, the invention can extend the high-temperature life of the cathode active material for a lithium ion battery. Furthermore, the use of such a cathode active material for a lithium ion battery can provide a lithium ion battery that has excellent high-temperature life and a high voltage.

DETAILED DESCRIPTION OF THE PREFERRED EMBODIMENTS

Figure 1:
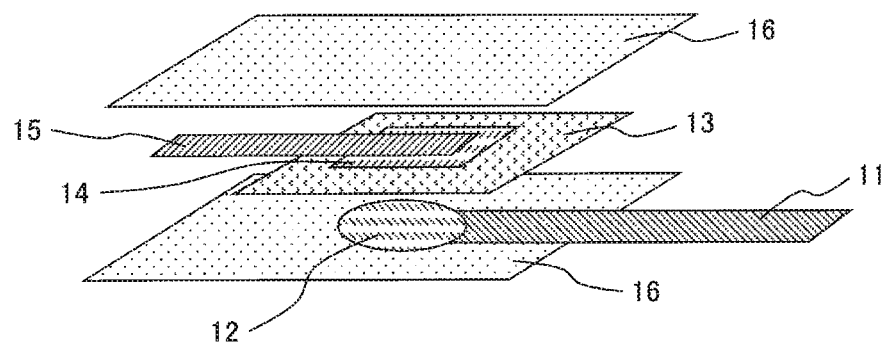
FIG. 1 is a schematic diagram showing a laminate cell used to measure the capacity of a cathode active material.

An increase in the amount of substitution x in the general formula $LiMn_{2-x}M_xO_4$ (where M is Ni, Co, Cr, Fe, Cu, or the like) might be more likely to generate different phases of nickel oxide and the like in preparation.

Meanwhile, the high-voltage lithium ion battery generally has a problem in terms of high-temperature life. One of the reasons for this is that oxidation and decomposition of an electrolyte progresses at the surface of the cathode at a high potential. At the same time, the cathode active material is supposed to be degraded. The degradation is mainly caused by elution of transition metal elements included in a 5 V spinel material.

A 4 V-class spinel-type composite oxide ($LiMnO_4$) in the related art also has the problem of elution of Mn ions under a high-temperature environment. In this aspect, there is a known mechanism in which a divalent Mn could be generated and eluted by disproportionation of trivalent Mn. However, the 5 V spinel material, which is brought into the strong oxidation state with its potential of around 4.7 V, causes the drastic elution, and this mechanism is considered to be related to moisture and fluorine ions as impurities of the electrolyte. Therefore, the measures for the spinel-type composite oxide, which is a conventional cathode active material with its potential of around 4.3 V, is not necessarily effective even in the 5 V spinel material.

Further, the eluted metal elements are known to precipitate at the anode, thereby degrading its performance. Impurities, such as nickel oxide, in the cathode active material might be eluted. The formation of different phases in preparation is not desirable.

The cathode active material described in Patent Document 3 has Ni as an essential element, but its composition range is wide, which might generate different phases.

Therefore, it is an object of the present invention to provide a cathode active material that has excellent high-temperature life and exhibits a high potential, as well as a high-voltage lithium ion battery that achieves excellent high-temperature life by applying such a cathode active material.

The inventors have found that a specific element reacts with the 5 V spinel material or substitutes for an element in the 5 V spinel material in a predetermined composition range, which exhibits a higher effect in improving the high-temperature life. Specifically, it is effective to substitute Ti, Ge, Mg, Co, Fe, Cu, or Al for Mn or Ni of the 5 V spinel material.

The composition rate H of Ni affects the ratio of a high-potential capacity at about 4.7 V to the total capacity of the 5 V spinel material. Here, x is set to satisfy the formula of $0.4 \leq x < 0.5$. Although the high-potential capacity exhibited is not specifically limited, 80% of the total capacity is preferably the high-potential capacity. In this aspect, x is desirably 0.4 or more. Meanwhile, when x is increased, different phases of nickel oxide or the like might be more likely to be generated in preparation. The preparation for the theoretical composition $LiMn_{1.5}Ni_{0.5}O_4$ without any different phases is difficult in terms of techniques, particularly, processes. Thus, to suppress the generation of different phases, x is desirably less than 0.5.

Fluorine has an effect of suppressing the elution and degradation of the metal elements. The mechanism is estimated based on the fact that fluorine has a higher electronegativity than oxygen, whereby a bonding force between the transition metal and anions becomes so strong that the elution can be suppressed. The composition is desirably set to satisfy the formula of $0 < \delta \leq 0.2$. When x exceeds 0.2, the high-potential capacity might be reduced, and impurities might be generated.

M is one or more kinds of elements selected from Ti, Ge, Mg, Co, Fe, Cu and Al, and substitutes for Mn or Ni of the 5 V spinel material. The function and mechanism of M slightly differ depending on the selected element, but these elements are considered to have the function of strengthening the spinel structure to thereby suppress the elution of the metal element and the degradation of the cathode active material, or of improving the performances, including enhancing the electric conductivity of the active material.

Coexistence of M in the appropriate amount of substitution z and fluorine in the appropriate amount δ exhibits the excessively high effect of suppressing the elution and degradation of the metal elements. The appropriate amount of substitution z depends on the kind of M element. However, any excessive amount of substitution might results in formation of different phases, reduction in high-potential capacity, or reduction in the effect of suppressing the degradation of the cathode active material.

The appropriate amount of substitution z is set as follows: $0 < z \leq 0.3$ when Ti is a main element; $0 < z \leq 0.2$ when Ge is a main element; $0 < z \leq 0.15$ when Co or Fe is a main element; $0 < z \leq 0.1$ when Mg or Cu is a main element; and $0 < z \leq 0.05$ when Al is a main element.

Here, a in the Li composition indicates an excessive amount from the theoretical composition, and Mn or Ni is considered to substitute for most of the excessive Li.

The cathode active material of the invention preferably has the cubic spinel structure, and the ratio of the total (a+x+y+z) of the composition rates to the composition rate of oxygen is 3:4, the total (a+x+y+z) being the composition rates of Ni, Mn and element M, and the composition rate "a" of the Li. A specific high-level analysis technique is required to determine whether or not the fluorine contained in the cathode active material of the present invention substitutes for oxygen atoms in the above-mentioned spinel material. It is not clear whether such a substitution affects the function and effect of the cathode active material. If the fluorine substitutes for oxygen atoms in the spinel material, when the composition rate of fluorine is defined as δ in the composition, the composition rate of oxygen is defined as 4-δ.

The formation of a specific coat or coating at the surface of 5 V spinel particles in the composition range of the invention further enhances the effect of suppressing the elution and degradation of metal elements. This is supposed to be because the effect of suppressing the degradation of active material particles is so high, even when a coat layer is partially degraded due to a change in volume of the cathode active material due to the charging and discharging, that the coat exhibits a physical complementary effect of preventing the direct contact between the active material and impurities in the electrolyte. The coat layer can be formed, for example, of a metal oxide, a metal fluoride, etc., and particularly, desirably an aluminum oxide. This is supposed to be because the aluminum oxide has high stability as the oxide, and an aluminum fluoride produced by the reaction of the aluminum oxide with fluorine ions in the electrolyte also has high stability.

Figure 3:
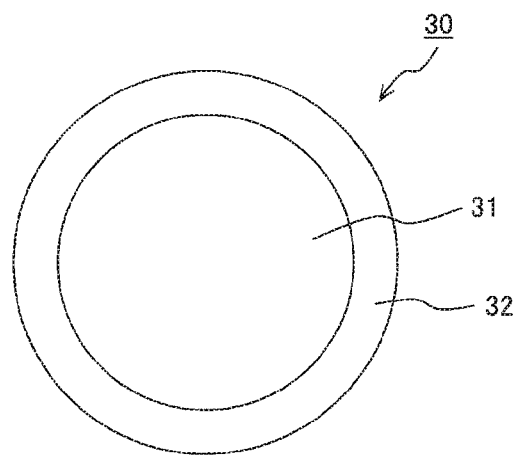
FIG. 3 is a schematic cross-sectional view showing a cathode material with a coat layer provided at the surface of the cathode active material in the invention.

FIG. 3 is a schematic cross-sectional view showing a cathode material with the coat layer provided at the surface of the cathode active material in the invention.

In FIG. 3, a cathode material 30 (coated cathode active material) has the surface of the cathode active material as a core material 31 covered with a metal oxide layer 32. The metal oxide layer 32 is desirably formed of aluminum oxide.

Although in FIG. 3, the metal oxide layer 32 covers the entire core material 31, the invention is not limited thereto. Alternatively, the metal oxide layer 32 may be attached to a part of the surface of the core material 31. In other words, the metal oxide layer 32 may be attached in a patchy fashion. Note that the cathode active material as the core material 31 will be described later.

The cathode active material of the invention can be obtained, for example, in the following way.

The cathode active material can be prepared in the same way as a general synthetic method of an inorganic compound. Raw materials are measured to have constituent elements in desired ratios and mixed together uniformly, followed by heat treatment, thereby producing the cathode active material. In such processes, a crushing or granulating step may be introduced.

Examples of a compound as the raw material for the cathode active material can include suitable oxides, hydroxides, chlorides, nitrates, carbonates, etc. of each element. The compound containing two or more elements can also be used as the raw material. For example, the compound as the raw material can be obtained by rendering a solution dissolving a transition metal element, such as Mn or Ni, mildly alkaline, and allowing a composite hydroxide to be precipitated. Alternatively, the compound as the raw material can also be obtained by spraying and drying a solution containing metal elements as the raw material.

As described in the present invention, when preparing the cathode active material containing many kinds of metal elements by a solid-phase method, preferably, the formation of different phases can be suppressed by preparing, in advance, the composite compound containing cations except for lithium as the raw material.

Means for causing fluorine to react is not specifically limited. A fluoride raw material, such as a lithium fluoride, can also be used as the raw material. Alternatively, after obtaining a spine composite oxide except for fluorine, the composite oxide can be prepared by being subjected to heat treatment together with an ammonium fluoride or acidic ammonium fluoride.

The mixing and heat treatment processes of these raw materials may be repeated as needed. At this time, mixing conditions and heat processing conditions can be selected as appropriate. Alternatively, while repeating the mixing and heat treatment processes, the raw material may be added as appropriate to obtain the composition ratio of interest in the final heat treatment. For example, raw materials for Mn and Ni are mixed and subjected to heat treatment to form oxides, to which a lithium raw material is then added, followed by heat treatment at a lower temperature, so that a composite oxide with a desired composition can also be obtained.

Means for providing the coat layer is not specifically limited. In the use of a liquid phase method, the coat layer may be formed by introducing particles of the 5 V spinel material into an aqueous solution dissolving the raw materials, followed by adjustment of a pH to precipitate the composite oxide, or by spraying and drying. Alternatively, the coat layer can also be formed by introducing particles of the 5 V spinel material into an organic solution dissolving metallic alkoxides and stirring them in the solution, and then evaporating and removing a solvent. On the other hand, in the use of a gas phase method, the coat layer may be formed by introducing gaseous raw materials into a reaction container of a fluidized bed in which particles of the 5 V spinel material are put, and causing the gaseous raw materials to react with the spinel particles, followed by precipitation. In any case, in the state where the reaction is not completed yet with a surface oxide formed, an oxidation process, or a heat treatment under a predetermined atmosphere may be performed.

The form of the cathode active material in the invention can be identified by instrumental analysis by applying an appropriate pretreatment to the cathode active material or the cathode using this material.

The presence or absence of a different phase or an impurity phase in the prepared cathode active material can be determined by powder X-ray diffraction (XRD) and the like.

Regarding a cathode active material in a battery, the battery is disassembled under an inert atmosphere to take out a cathode, and the cathode is then subjected to the appropriate pretreatment, so that the state of the cathode active material can be identified by the same type of instrumental analysis. Here, the cathode taken out of the battery is washed with an organic solvent having the same components as the electrolyte, or with acetone or the like, thereby producing a cathode for analysis. Further, a cathode mixture containing the active material is sampled from the cathode, and then a binder and the components derived from the electrolyte at the surface of the cathode active material are removed therefrom with organic solvent, such as an N-methyl-2-pyrolidone (NMP), thereby taking out solid powder. A conductive agent and the cathode active material can be easily distinguished by means, including inspection of the form with a scanning electron microscope (SEM), composition analysis with an energy dispersive spectrometer (EDX), and the like.

The composition of the cathode active material and the composition of the surface portion can also be determined by an ICP emission spectrometric analysis (ICP-AES), an X-ray photoemission spectroscopy (XPS), an Auger electron spectroscopy (AES), a fluorescent X-ray (XRT) analysis, a secondary ion mass spectrometry (SIMS), a glow-discharge mass spectrometry (GD-MS), and the like.

Next, an example of the structure of a lithium ion battery in the invention will be described.

The cathode of the invention is fabricated using the cathode active material according to the invention, for example, in the following way.

Particles of the cathode active material and the conductive agent, such as carbon black (CB), are mixed into a mixture, to which a solution dissolving a binder as a binding agent is added, mixed, and stirred, thereby preparing a cathode mixture slurry. The slurry is applied to a cathode collector made of an aluminum foil and the like and dried out. Thereafter, the cathode collector with the dried slurry is formed by pressing and the like, and/or cut into a desired size, thereby fabricating the cathode.

The binder is not particularly limited. The well-known binders can be used as the binder, and include a fluororesin, such as a polyvinylidenefluoride, a cellulose-based polymer, a styrene resin, an acrylic resin, and the like. The binder can be used in the form of solution by being dissolved in a solvent, such as water or NMP, depending on the kind of the binder.

An anode active material used in the lithium ion battery of the invention is not specifically limited. Examples of the anode active material suitable for use can include lithium metal, various kinds of carbon materials, lithium titanate, oxides of tin, silicon, etc., metals, such as tin or silicon, that forms an alloy with lithium, and a composite material made of these materials.

When using powder anode active materials, the anode is fabricated, for example, in the following way.

The anode active material and the binder are dissolved into a solution to have a desired mixture composition. The solution and a conductive agent, such as CB, are measured and mixed as needed to thereby prepare a negative mixture slurry. The slurry is applied to an anode collector made of a copper foil and the like and dried out. Thereafter, the anode collector with the dried slurry is formed by pressing and the like, and/or is cut into a desired size, whereby the anode is fabricated.

The electrolyte is not specifically limited. A non-aqueous electrolyte that dissolves, in a non-aqueous solvent, lithium salts used in a conventional lithium ion battery can be used as the electrolyte.

Examples of lithium salts suitable for use can include $LiClO_4$, $LiCF_3SO_3$, $LiPF_6$, $LiBF_4$, $LiAsF_6$, etc. One of these lithium salts can be used solely, or two or more thereof can be used in combination.

The non-aqueous solvents suitable for use can include various cyclic carbonates and chain carbonates. Examples of the non-aqueous solvent can include ethylene carbonate, propylene carbonate, dimethyl carbonate, methyl ethyl carbonate, and diethyl carbonate. Alternatively, a carbonate derivative can be used which has a higher resistance to oxidation, the carbonate derivative being substituted by fluorine or the like for a part of hydrogen thereof. Various additives can also be added to the non-aqueous electrolyte without departing from the object of the invention. For example, vinylene carbonate can also be added for the purpose of improving the battery life, or phosphoric ester and the like can also be added to impart flame retardance.

Alternatively, ionic liquid that is a liquid salt at normal temperature, such as imidazolium/fluorosulfonic imide can also be used.

Further, various solid electrolytes, including sulfur-based electrolytes, phosphate-based electrolytes, such as titanium phosphate-based or germanium phosphate-based electrolyte, and lanthanum-zirconium-oxide-based electrolytes, can also be used.

Batteries, including a button battery, a cylindrical battery, a square battery, and a laminate battery, etc., according to the one embodiment of the lithium ion battery in the invention are fabricated by using the above-mentioned cathode, anode, and electrolyte.

The cylindrical secondary battery will be fabricated in the following way.

Each of a cathode and an anode is obtained by cutting a metal foil in a strip shape with terminals for taking out current provided at an uncoated part. The thus-obtained cathode and anode are used. A separator is sandwiched between the cathode and the anode and wound in a cylindrical shape to thereby fabricate a bundle of electrodes, which is then accommodated in a casing made of SUS steel or aluminum. Then, a non-aqueous electrolyte is charged into the casing accommodating therein the bundle of electrodes, under a dry air or inert gas atmosphere, followed by sealing the casing, which produces a cylindrical lithium ion battery.

The separator suitable for use can be a porous insulating film made of resin, such as polyethylene, polypropylene, or aramid, or the porous insulating film provided with an inorganic compound layer made of alumina and the like.

Figure 4:
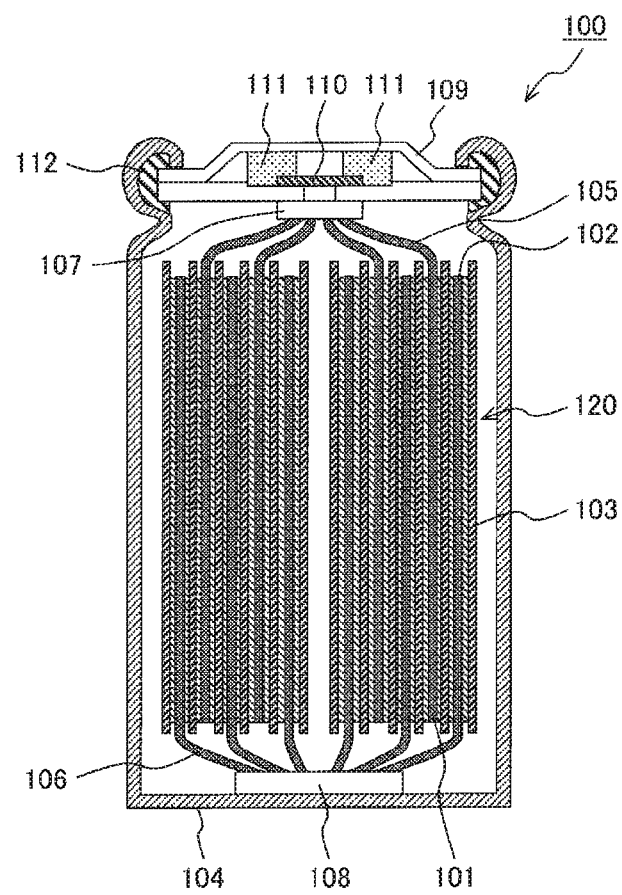
FIG. 4 is a schematic structure diagram showing an example of a lithium ion battery in the invention.

FIG. 4 shows an example of a cylindrical lithium ion battery.

In this figure, a lithium ion battery 100 includes a bundle of electrodes 120 in which a cathode plate 101 (cathode) and an anode plate 102 (anode) are wound via a separator 103, and a bottomed cylindrical battery can 104 made of steel with nickel plated. The bundle of electrodes 120 is accommodated in the battery can 104.

Above the bundle of electrodes 120, an aluminum cathode collector lead 107 is disposed substantially on an extended line of the winding center to collect current at the potential from the cathode plate 101. The cathode collector lead 107 is bonded by ultrasound to the ends of cathode collector lead pieces 105 derived from the cathode plate 101. Above the cathode collector lead 107, a disk-shaped battery lid 109 is disposed as a cathode external terminal.

The battery lid 109 includes a disk-shaped terminal plate made of steel and having its center protruding upward, and an annular flat plate made of aluminum and having an opening for gas discharge formed at the center thereof. An annular cathode terminal 111 is disposed between the protrusion of the terminal plate and the flat plate. The cathode terminal 111 has its upper surface and its lower surface coming into contact with the lower surface of the terminal plate and the upper surface of the flat plate, respectively. The inner diameter of the cathode terminal 111 is formed larger than that of the opening formed in the flat plate. Above the opening of the flat plate, a burst valve 110 is disposed to close the opening. The burst valve 110 is adapted to be broken and opened upon an increase in internal pressure of the battery. The peripheral edge of the burst valve 110 is sandwiched between the flat plate and the lower surface of the inner edge of the cathode terminal 111. The peripheral edge of the terminal plate is fixed to the peripheral edge of the flat plate. The upper surface of the cathode collector lead 107 is bonded by resistance welding to the lower surface of the flat plate, that is, the bottom surface (surface on a side of the bundle of electrodes 120) of the battery lid 109.

On the other hand, under the bundle of electrodes 120, a nickel anode collector lead 108 is disposed to collect current at the potential from the anode plate 102. The anode collector lead 108 is bonded by ultrasound to the ends of anode collector lead pieces 106 derived from the anode plate 102. The anode collector lead 108 is bonded by resistance welding to the inner bottom part of the battery can 104 that also serves as an anode external terminal.

The non-aqueous electrolyte is charged into the battery can 104. The non-aqueous electrolyte used is one that dissolves hexafluorophosphate ($LiPF_6$) at a concentration of 1 mol/L in a mixed organic solvent containing ethylene carbonate (EC) and ethyl methyl carbonate (EMC) at a volume ratio of 1:2. The battery lid 109 is caulked and fixed to the upper part of the battery can 104 via a gasket 112. Thus, the inside of the lithium ion battery 100 is hermetically sealed.

In the bundle of electrodes 120 accommodated in the battery can 104, the cathode plate 101 and the anode plate 102 are wound via the microporous separator 103, for example, made of polyethylene, such that the cathode plate 101 does not come into contact with the anode plate 102. The cathode collector lead piece 105 and the anode collector lead piece 106 are disposed respectively at both opposing end surfaces of the bundle of electrodes 120. The entire outer peripheral surface of the bundle of electrodes 120 is covered with the insulating coating to prevent the electric contact with the battery can 104.

To obtain a square battery, for example, the battery is fabricated in the following way.

In the above-mentioned winding, two winding axes are provided to thereby fabricate an elliptical bundle of electrodes. Like the cylindrical battery, this bundle of electrodes is accommodated in a square casing, and an electrolyte is charged thereinto. Thereafter, the casing is hermetically sealed.

Instead of winding, a bundle of electrodes can be used that includes a stack of a separator, a cathode, a separator, an anode, and a separator in this order.

To obtain a laminate battery, for example, the battery is fabricated in the following way.

The above-mentioned stack type bundle of electrodes is accommodated in a pouched aluminum laminate sheet that is lined with an insulating sheet made of polyethylene, polypropylene, etc. With terminals of the electrodes protruding from an opening, the electrolyte is charged, and then the opening is sealed.

The applications for the lithium ion battery of this embodiment are not specifically limited. For example, the lithium ion battery of this embodiment can be used as various types of large-sized power sources, including power sources for driving an electric vehicle, a hybrid-EV, etc., power sources for industrial equipment, such as an elevator, having a system for recovering at least part of kinetic energy, power sources in electric storage systems for use in various business affairs or for home use, and further power sources for power generation systems by natural energy, such as sunlight and wind power.

The lithium ion battery of this embodiment can also be used as various types of small-sized power sources, including various types of mobile devices and information devices, electric devices for home use, and electric tools.

Now, the detailed examples of the lithium ion battery in the invention will be specifically described. Note that the invention is not limited to Examples to be described later.

Example 1

A cathode active material was prepared by a solid-phase method.

The following raw materials were used: manganese dioxide ($MnO_2$), nickel oxide (NiO), titanium oxide ($TiO_2$), germanium oxide ($GeO_2$), tricobalt tetroxide ($Co_3O_4$), magnesium oxide (MgO), copper oxide (CuO), aluminum hydroxide ($Al(OH)_3$), lithium carbonate ($Li_2CO_3$) and lithium fluoride (LiF).

After measuring the respective raw materials to have a target composition, all raw materials except for lithium carbonate and lithium fluoride were put in a planetary grinding mill, and wet-blended using pure water. After drying, the raw materials were put in an alumina crucible and sintered by an electric furnace at 1050° C. for 15 hours under air atmosphere to produce composite oxide powder. The composite oxide powder and the remaining raw materials ($Li_2CO_3$ and LiF) were mixed in the same way and dried, followed by sintering in the alumina crucible at 780° C. for 20 hours, and subsequently at 600° C. for 12 hours under the air atmosphere. The powder obtained in this way was crushed to have a desired grain size, thereby producing the cathode active material.

The thus-obtained cathode active material was examined by powder X-ray diffraction (by CuKα beams at a tube voltage of 40 kV as well as a tube current of 40 mA) to confirm the presence of a spinel phase and a different phase.

(Fabrication of Cathode)

After blending 6% by mass of CB as the conductive agent into 90% by mass of the cathode active material, an NMP solution containing 4% by mass of an acrylic binder as a bonding agent was added to and mixed with the cathode active material and CB, thereby preparing a cathode slurry. The cathode slurry obtained was applied to one side of an aluminum foil.

After drying, the aluminum foil with the slurry was cut and compression-formed, and an aluminum terminal was welded to an uncoated part, whereby a cathode for evaluation of the battery was fabricated.

Aside from this, a cathode for measurement of the capacity was further fabricated by punching a part of 20 mm in diameter from the aluminum foil, and compression-forming the punched part.

(Fabrication of Anode)

After blending 88% by Mass of lithium titanate ($Li_4Ti_5O_{12}$:LTO) as the anode material and 6% by mass of CB, an NMP solution containing 6% by mass of polyvinylidene fluoride as a bonding agent was mixed with the anode material and CB, thereby preparing an anode mixture slurry. The anode mixture slurry obtained was applied to one side of a copper foil (anode collector) and dried. After cutting, the copper foil with the slurry was compression-formed by a press machine, and a nickel anode terminal was welded to an uncoated part, whereby an anode of the battery is fabricated.

(Measurement of Capacity of Cathode Active Material)

FIG. 1 schematically shows the laminate cell used for measurement of the capacity of the cathode active material.

In FIG. 1, a cathode 12 for measuring the capacity, a porous separator 13 made of polypropylene and having a thickness of 30 μm, a lithium metal foil 14, and a copper collector foil 15 were stacked in this order over an aluminum collector foil 11. The stack was sandwiched between laminated sheets 16 lined with polypropylene, and then three sides of the laminated sheets 16 were sealed in such a manner as to protrude the collector foils 11 and 15 therefrom.

After charging the non-aqueous electrolyte thereinto, the bottom of the sheets were sealed, thereby fabricating a cell. Here, the non-aqueous electrolyte used was one that dissolved lithium hexafluorophosphate as a lithium salt at a concentration of 1 mol/$dm^3$ in a non-aqueous mixed solvent that contained a mixture of ethylene carbonate and dimethyl carbonate at a volume ratio of 3:7.

Charging and discharging of this cell was repeated three time at an hour rate of charge/discharge current of 0.2 CA. Specifically, the battery was charged each time at a constant current and a constant voltage for the total charge time of 6 hours with the upper limit of charge voltage of 4.9 V, and discharged each time at a constant current with the lower limit of discharge voltage of 3.5 V. A quantity of electricity resulting from the third discharge process and a quantity of electricity at 4.5 V or higher were measured, and thereby determined the whole capacity and high-potential capacity (mAh/g) per mass (g) of the active material in the cathode, respectively.

(Fabrication of Battery)

Figure 2:
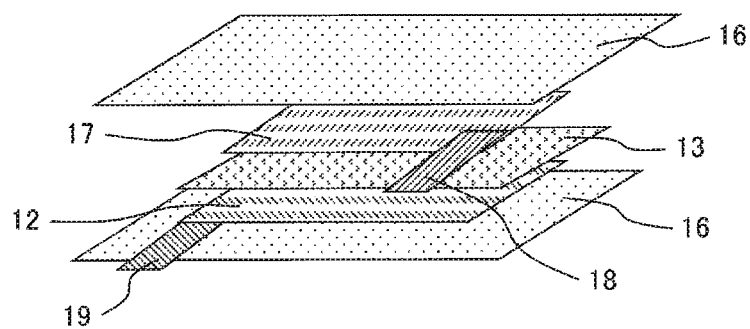
FIG. 2 is a schematic diagram showing a laminate battery.

FIG. 2 schematically shows a fabricated laminate lithium ion battery.

As shown in FIG. 2, a cathode 12, a porous separator 13, and an anode 17 were stacked in this order. The stack was sandwiched between the laminated sheets 16, and three sides other than the bottom side (which is the opposite side to the terminals) of the laminated sheets were sealed to protrude a nickel anode terminal 18 and an aluminum cathode terminal 19. After charging the non-aqueous electrolyte thereinto, the bottom side was sealed, thereby fabricating a battery.

The non-aqueous electrolyte used was one that dissolved lithium hexafluorophosphate as a lithium salt at a concentration of 1 mol/$dm^3$ in a non-aqueous mixed solvent that contains a mixture of ethylene carbonate and dimethyl carbonate at a volume ratio of 3:7.

(Charge and Discharge Test and High-Temperature Life Test)

The fabricated battery was subjected to a charge and discharge test and a high-temperature life test.

The charge conditions included: charge at a constant current and a constant voltage at an hour rate of charge current of 0.2 CA with the upper limit of charge voltage of 3.4 V for the total charge time of 6 hours. The discharge conditions included: discharge at a constant current with the lower limit of discharge voltage of 2 V at an hour rate of discharge current of 0.2 CA. Such a charge and discharge cycle was repeated 5 times, and the discharge capacity in the fifth cycle was defined as a battery capacity.

Next, the high-temperature test was performed. After charging under the same conditions, the battery was stored under an environment at 50° C. for 30 days. Then, after constant-current discharge at 2 V at an hour rate of discharge current of 0.2 CA, the same charge and discharge cycle as that in measurement of the battery capacity was performed. The discharge capacity at this time was defined as a capacity after the storage test, and a ratio of the capacity after the storage test to that before the storage (maintenance rate) was determined.

Table 1 shows names and compositions of the prepared cathode active materials as well as the presence or absence of a different phase.

Table 2 shows the whole capacity and high-potential capacity and a ratio therebetween of the cathode active materials prepared, as well as the capacity maintenance rate of the battery after storage for 30 days.

TABLE 1

|  | Name | Li | Ni | Mn | M Element | M Composition | O | F | Presence or absence of different phases |
|---|---|---|---|---|---|---|---|---|---|
| Example G | Cathode active material G1 | 1.00 | 0.45 | 1.35 | Ge | 0.20 | 3.80 | 0.20 | Absence |
|  | Cathode active material G2 | 1.00 | 0.49 | 1.41 | Ge | 0.10 | 3.95 | 0.05 | Absence |
|  | Cathode active material G3 | 1.08 | 0.40 | 1.47 | Ge | 0.05 | 3.85 | 0.15 | Absence |
|  | Cathode active material GU | 1.02 | 0.43 | 1.35 | Ge / Cu | 0.15 / 0.05 | 3.90 | 0.10 | Absence |
| Comparative Example G | Comparative active material GA | 1.00 | 0.45 | 1.35 | Ge | 0.20 | 4.00 | 0.00 | Absence |
|  | Comparative active material GB | 1.00 | 0.45 | 1.30 | Ge | 0.25 | 3.80 | 0.20 | Presence |
| Example T | Cathode active material T1 | 1.00 | 0.45 | 1.25 | Ti | 0.30 | 3.80 | 0.20 | Absence |
|  | Cathode active material T2 | 1.00 | 0.49 | 1.36 | Ti | 0.15 | 3.90 | 0.10 | Absence |
|  | Cathode active material T3 | 1.08 | 0.40 | 1.47 | Ti | 0.05 | 3.95 | 0.05 | Absence |
|  | Cathode active material TM | 1.00 | 0.45 | 1.30 | Ti / Mg | 0.2 / 0.05 | 3.90 | 0.10 | Absence |
| Comparative Example T | Comparative active material TA | 1.00 | 0.45 | 1.25 | Ti | 0.30 | 4.00 | 0.00 | Absence |
|  | Comparative active material TB | 1.00 | 0.45 | 1.20 | Ti | 0.35 | 3.90 | 0.10 | Presence |
|  | Comparative active material T5 | 1.00 | 0.50 | 1.20 | Ti | 0.30 | 3.80 | 0.20 | Presence |
| Example CO | Cathode active material CO1 | 1.00 | 0.45 | 1.40 | Co | 0.15 | 3.80 | 0.20 | Absence |
|  | Cathode active material CO2 | 1.05 | 0.40 | 1.50 | Co | 0.05 | 3.80 | 0.20 | Absence |
| Comparative Example CO | Comparative active material COA | 1.00 | 0.45 | 1.40 | Co | 0.15 | 4.00 | 0.00 | Absence |
|  | Comparative active material COB | 1.00 | 0.45 | 1.35 | Co | 0.20 | 3.80 | 0.20 | Absence |
| Example F | Cathode active material F1 | 1.00 | 0.45 | 1.40 | Fe | 0.15 | 3.80 | 0.20 | Absence |
|  | Cathode active material F2 | 1.05 | 0.45 | 1.45 | Fe | 0.05 | 3.85 | 0.15 | Absence |
| Comparative Example F | Comparative active material FA | 1.00 | 0.45 | 1.40 | Fe | 0.15 | 4.00 | 0.00 | Absence |
|  | Comparative active material FB | 1.00 | 0.45 | 1.35 | Fe | 0.20 | 3.80 | 0.20 | Presence |
| Example M | Cathode active material M1 | 1.00 | 0.45 | 1.45 | Mg | 0.10 | 3.80 | 0.20 | Absence |
|  | Cathode active material M2 | 1.05 | 0.42 | 1.48 | Mg | 0.05 | 3.90 | 0.10 | Absence |
|  | Cathode active material M3 | 1.00 | 0.48 | 1.50 | Mg | 0.02 | 3.80 | 0.20 | Absence |
| Comparative Example M | Comparative active material MA | 1.00 | 0.45 | 1.45 | Mg | 0.10 | 4.00 | 0.00 | Absence |
|  | Comparative active material MB | 1.00 | 0.45 | 1.40 | Mg | 0.15 | 3.80 | 0.20 | Absence |
|  | Comparative active material M5 | 1.00 | 0.50 | 1.40 | Mg | 0.10 | 3.80 | 0.20 | Presence |
| Example CU | Cathode active material CU1 | 1.00 | 0.40 | 1.50 | Cu | 0.10 | 3.80 | 0.20 | Absence |
|  | Cathode active material CU2 | 1.00 | 0.49 | 1.46 | Cu | 0.05 | 3.80 | 0.20 | Absence |
| Comparative Example CU | Comparative active material CUA | 1.00 | 0.40 | 1.50 | Cu | 0.10 | 4.00 | 0.00 | Absence |
|  | Comparative active material CUB | 1.00 | 0.45 | 1.40 | Cu | 0.15 | 3.80 | 0.20 | Absence |
| Example A | Cathode active material A1 | 1.00 | 0.45 | 1.50 | Al | 0.05 | 3.90 | 0.10 | Absence |
| Comparative Example A | Comparative active material AA | 1.00 | 0.45 | 1.50 | Al | 0.05 | 4.00 | 0.00 | Absence |
|  | Comparative active material AB | 1.00 | 0.45 | 1.47 | Al | 0.08 | 3.90 | 0.10 | Presence |
|  | Comparative active material A5 | 1.00 | 0.50 | 1.45 | Al | 0.05 | 3.90 | 0.10 | Presence |
| Comparative Example N | Comparative active material NA | 1.00 | 0.45 | 1.55 | — | 0.00 | 4.00 | 0.00 | Absence |
|  | Comparative active material N5 | 1.00 | 0.50 | 1.50 | — | 0.00 | 4.00 | 0.00 | Presence |
|  | Comparative active material NF | 1.00 | 0.45 | 1.55 | — | 0.00 | 3.80 | 0.20 | Absence |

TABLE 2

|  |  | Capacity of cathode active material (mAh/g) | | | |
|---|---|---|---|---|---|
|  | Name | (A) Whole capacity | (B) High potential | (B)/(A) (%) | Capacity maintenance rate (%) |
| Example G | Cathode active material G1 | 118 | 97 | 82 | 95 |
|  | Cathode active material G2 | 124 | 106 | 85 | 86 |
|  | Cathode active material G3 | 115 | 99 | 86 | 79 |
|  | Cathode active material GU | 115 | 100 | 87 | 82 |
| Comparative Example G | Comparative active material GA | 123 | 100 | 81 | 71 |
|  | Comparative active material GB | — | — | — | — |
| Example T | Cathode active material T1 | 122 | 108 | 89 | 95 |
|  | Cathode active material T2 | 125 | 111 | 89 | 87 |
|  | Cathode active material T3 | 115 | 102 | 89 | 79 |
|  | Cathode active material TM | 120 | 101 | 84 | 88 |
| Comparative Example T | Comparative active material TA | 128 | 113 | 88 | 72 |
|  | Comparative active material TB | — | — | — | — |
|  | Comparative active material T5 | — | — | — | — |
| Example CO | Cathode active material CO1 | 112 | 91 | 81 | 86 |
|  | Cathode active material CO2 | 115 | 95 | 83 | 78 |
| Comparative Example CO | Comparative active material COA | 113 | 92 | 81 | 69 |
|  | Comparative active material COB | 107 | 81 | 76 | — |
| Example F | Cathode active material F1 | 120 | 102 | 85 | 82 |
|  | Cathode active material F2 | 118 | 99 | 84 | 77 |
| Comparative Example F | Comparative active material FA | 122 | 103 | 84 | 65 |
|  | Comparative active material FB | — | — | — | — |
| Example M | Cathode active material M1 | 111 | 95 | 86 | 85 |

TABLE 2-continued

| | Name | Capacity of cathode active material (mAh/g) | | | Capacity maintenance rate (%) |
| | | (A) Whole capacity | (B) High potential | (B)/(A) (%) | |
|---|---|---|---|---|---|
| | Cathode active material M2 | 109 | 96 | 88 | 81 |
| | Cathode active material M3 | 118 | 104 | 88 | 78 |
| Comparative Example M | Comparative active material MA | 112 | 95 | 85 | 69 |
| | Comparative active material MB | — | — | — | — |
| | Comparative active material M5 | — | — | — | — |
| Example CU | Cathode active material CU1 | 125 | 100 | 80 | 81 |
| | Cathode active material CU2 | 126 | 101 | 80 | 76 |
| Comparative Example CU | Comparative active material CUA | 126 | 102 | 81 | 63 |
| | Comparative active material CUB | 118 | 97 | 82 | 74 |
| Example A | Cathode active material A1 | 121 | 108 | 89 | 85 |
| Comparative Example A | Comparative active material AA | 125 | 113 | 90 | 72 |
| | Comparative active material AB | — | — | — | — |
| | Comparative active material A5 | — | — | — | — |
| Comparative Example N | Comparative active material NA | 130 | 116 | 89 | 58 |
| | Comparative active material N5 | — | — | — | — |
| | Comparative active material NF | 115 | 102 | 89 | 68 |

All the prepared cathode active materials belonged to the cubic spinel structure, but some of Comparative Examples were observed to have different phases.

A comparative active material NA and a comparative active material N5 in Comparative Example N were active materials not having fluorine and a substitution element M. In the comparative active material N5 (x=0.5) having the Ni substitution amount x of 0.5, a different phase that was considered as NiO was recognized. The comparative active material NF was an active material containing fluoride with no substitution element M.

Example G and Comparative Example G corresponded to the cathode active materials in which the element M was mainly Ge. Example G of the invention had the effects of having no difference phase recognized, having a high-potential capacity of 80% or higher, and obtaining a higher capacity maintenance rate, compared to the comparative active material GA and Comparative Examples N which did not contain fluorine. A comparative active material GB having the amount of substitution z exceeding 0.2 (z>0.2) was recognized to have a different phase.

Example T and Comparative Example T corresponded to the cathode active materials in which the element M was mainly Ti. Example T of the invention had the effects of having no different phase recognized, having a high-potential capacity of 80% or higher, and obtaining a higher capacity maintenance rate, compared to the comparative active material TA and Comparative Examples N which did not contain fluorine. A comparative active material TB having the amount of substitution z exceeding 0.3 (z>0.3) and a comparative active material T5 having the Ni substitution amount x (x=0.5) were recognized to have different phases.

Example CO and Comparative Example CO corresponded to the cathode active materials in which the element M was mainly Co. Example CO of the invention had the effects of having no different phase recognized, having a high-potential capacity of 80% or higher, and obtaining a higher capacity maintenance rate, compared to the comparative active material COA and Comparative Examples N which did not contain fluorine. A comparative active material COB having the amount of substitution z exceeding 0.15 (z>0.15) did not have a different phase recognized, but had the ratio of the high-potential capacity of less than 80%.

Example F and Comparative Example F corresponded to the cathode active materials in which the element M was mainly Fe. Example F of the invention had the effects of having no different phase recognized, having a high-potential capacity of 80% or higher, and obtaining a higher capacity maintenance rate, compared to the comparative active material FA and Comparative Examples N which did not contain fluorine. A comparative active material FB having the amount of substitution z exceeding 0.15 (z>0.15) had a different phase recognized.

Example M and Comparative Example M corresponded to the cathode active materials in which the element M was mainly Mg. Example M of the invention had the effects of having no different phase recognized, having a high-potential capacity of 80% or higher, and obtaining a higher capacity maintenance rate, compared to the comparative active material MA and Comparative Examples N which did not contain fluorine. A comparative active material MB having the amount of substitution z exceeding 0.1 (z>0.1) and a comparative active material M5 having the Ni substitution amount x of 0.5 (x=0.5) had different phases recognized.

Example CU and Comparative Example CU corresponded to the cathode active materials in which the element M was mainly Cu. Example CU of the invention had the effects of having no different phase recognized, having a high-potential capacity of 80% or higher, and obtaining a higher capacity maintenance rate, compared to the comparative active material CUA and Comparative Examples N which did not contain fluorine. A comparative active material CUB having the amount of substitution z exceeding 0.1 (z>0.1) had only the effect of achieving the slightly higher capacity maintenance rate than in Comparative Example.

Example A and Comparative Example A corresponded to the cathode active materials in which the element M was mainly Al. Example A of the invention had the effects of having no different phase recognized, having a high-potential capacity of 80% or higher, and obtaining a higher capacity maintenance rate, compared to the comparative active material AA and Comparative Examples N which did not contain fluorine. A comparative active material AB having the amount of substitution z exceeding 0.05 (z>0.05) and a comparative active material A5 having the Ni substitution amount x of 0.5 (x=0.5) were observed to have different phases recognized.

Example 2

The coated cathode active material that was coated with an aluminum oxide was prepared in the following way.

Aluminum isopropoxide was introduced into isopropyl alcohol (IPA) and stirred at 60° C. in a hot-water bath, and then were allowed to stand still at room temperature all night and day. Then, 100 g of supernatant liquid and 20 g of the cathode active material (core material) were introduced into a flask. While the mixture was stirred at 60° C. in a hot-water bath, a solution containing IPA and distilled water at a volume ratio of 10:1 was introduced into the mixture and stirred. Then, the solution was decompressed to allow the solvent to evaporate, and then dried. Powder obtained in this way was dried at 80° C. in air, and further was subjected to heat treatment at 600° C. for 5 hours under the air atmosphere, thereby producing the coated cathode active material (cathode active material having an aluminum oxide layer).

Table 3 shows the names and core materials of the coated cathode active materials prepared, the whole capacity and high-potential capacity thereof and a ratio therebetween, as well as the capacity maintenance rates after storage for 30 days.

TABLE 3

|  | Name | Core material | Capacity of cathode active material (mAh/g) | | (B)/(A) (%) | Capacity maintenance rate (%) |
| --- | --- | --- | --- | --- | --- | --- |
|  |  |  | (A) Whole capacity | (B) High potential |  |  |
| Example | Coated cathode active material G1 | Cathode active material G1 | 118 | 97 | 82 | 98 |
|  | Coated cathode active material T1 | Cathode active material T1 | 122 | 108 | 89 | 96 |
|  | Coated cathode active material M1 | Cathode active material M1 | 111 | 95 | 86 | 94 |
| Comparative Example | Comparative coated active material NA | Comparative active material NA | 130 | 116 | 89 | 64 |
|  | Comparative coated active material NF | Comparative active material NF | 115 | 102 | 89 | 69 |

As can be seen from this table, the coated active materials in Examples had the high-potential capacity of 80% or more, and had the higher capacity maintenance rate as compared to the coated active materials in Comparative Examples. Further, it also shows that the coated active materials in Examples exhibit the high capacity maintenance rates, compared to those of the respective core materials.

Coated active materials in Comparative Examples had higher capacity maintenance rates than those of the core materials, but had the lower capacity maintenance rates than those of all Examples shown in Tables 1 and 2.

DESCRIPTION OF REFERENCE NUMERALS

11: Aluminum collector foil, 12: Cathode, 13: Porous separator; 14: Metal lithium foil, 15: Copper collector foil; 16: Laminated sheet, 17: Anode, 18: Nickel anode terminal, 19: Aluminum cathode terminal.

What is claimed is:

1. A cathode active material for a lithium ion battery, the cathode active material being represented by a compositional formula $Li_aNi_xMn_yM_zO_{4-\delta}F_\delta$, where M is one or more elements selected from the group consisting of Ti, Ge, Mg, Co, Fe, Cu and Al, and a, x, y, z and δ satisfy the following formulas:

$1 \leq a < 1.08$, $0.4 \leq x < 0.5$, $0 < z \leq 0.3$, $a+x+y+z=3$, and $0 < \delta \leq 0.2$.

2. The cathode active material for a lithium ion battery according to claim 1, wherein M contains Ti, and one or more elements selected from Ge, Mg, Co, Fe, Cu and Al, and a Ti content in M is 50% or more based on moles.

3. The cathode active material for a lithium ion battery according to claim 1, wherein M contains Ge, and one or more elements selected from Ti, Mg, Co, Fe, Cu and Al, and a Ge content in M is 50% or more based on moles, and z satisfies the formula of $0 < z \leq 0.2$.

4. The cathode active material for a lithium ion battery according to claim 1, wherein M contains Co or Fe, and one or more elements selected from Ti, Ge, Mg, Cu and Al, a content of either Co or Fe in M is 50% or more based on moles, and z satisfies the formula of $0 < z \leq 0.15$.

5. The cathode active material for a lithium ion battery according to claim 1, wherein M contains Mg or Cu, and one or more elements selected from Ti, Ge, Co, Fe and Al, a content of either Mg or Cu in M is 50% or more based on moles, and z satisfies the formula of $0 < z \leq 0.1$.

6. The cathode active material for a lithium ion battery according to claim 1, wherein M contains Al, and one or more elements selected from Ti, Ge, Mg, Co, Fe and Cu, a content of Al in M is 50% or more based on moles, and z satisfies the formula of $0 < z \leq 0.05$.

7. The cathode active material for a lithium ion battery according to claim 1, wherein the cathode active material has a cubic spinel structure.

8. A cathode material for a lithium ion battery comprising:

the cathode active material for a lithium ion battery according to claim 1; and an aluminum oxide layer covering a surface of the cathode active material.

9. A lithium ion battery, comprising:

a cathode including the cathode active material for a lithium ion battery according to claim 1;

an anode; and an electrolyte.

* * * * *